United States Patent [19]

Waldman

[11] 3,961,986
[45] June 8, 1976

[54] METHOD AND APPARATUS FOR CONTROLLING THE FUEL FLOW TO A STEAM REFORMER IN A FUEL CELL SYSTEM

[75] Inventor: Elliot I. Waldman, West Hartford, Conn.

[73] Assignee: United Technologies Corporation, Hartford, Conn.

[22] Filed: Nov. 20, 1975

[21] Appl. No.: 633,993

[52] U.S. Cl. .............................. 136/86 B; 136/86 C
[51] Int. Cl.² ........................................ H01M 8/06
[58] Field of Search .............. 136/86 R, 86 B, 86 C

[56] References Cited
UNITED STATES PATENTS

| | | | |
|---|---|---|---|
| 3,480,417 | 11/1969 | Setzer | 136/86 C |
| 3,585,077 | 6/1971 | Waldman | 136/86 B |

Primary Examiner—John H. Mack
Assistant Examiner—H. A. Feeley
Attorney, Agent, or Firm—Stephen E. Revis

[57] ABSTRACT

A fuel cell system includes an ejector for pumping steam and fuel into a steam reformer. Steam is the primary flow through the ejector and fuel is the secondary flow. The rate of steam flow is metered by a variable area orifice in the ejector. The fuel passes through a laminar restrictor in the conduit carrying the fuel to the ejector. A pressure regulator increases and decreases the pressure of the fuel supplied to the laminar restrictor by amounts equal to increases and decreases in the ejector back pressure thereby eliminating the ejector back pressure as a factor affecting the rate of fuel flow into the ejector. The laminar restrictor is designed to match the fuel flow to the ejector pumping characteristics so as to provide the desired steam to fuel ratio for the steam reformer for each operational mode of the fuel cell.

7 Claims, 1 Drawing Figure

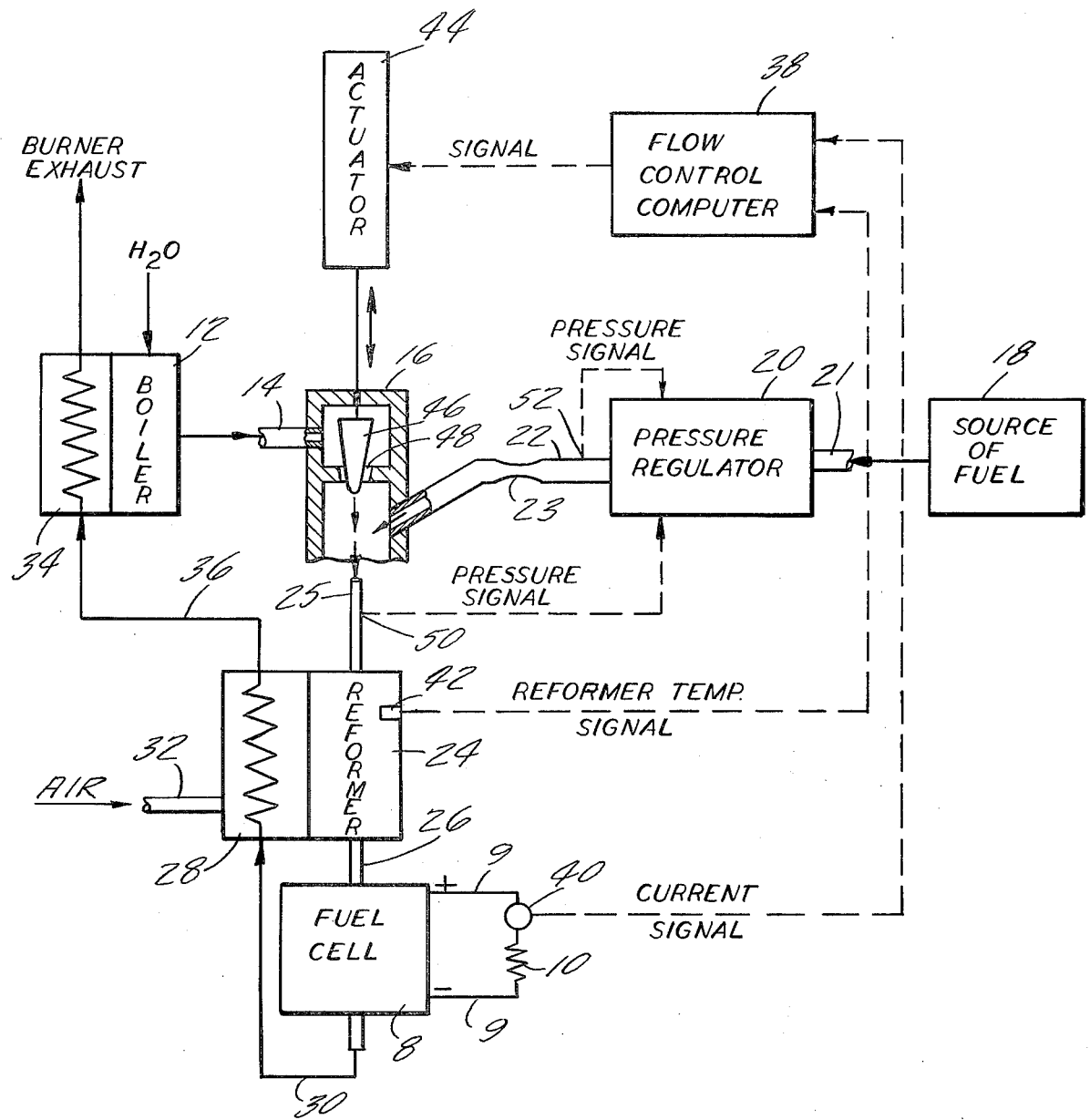

METHOD AND APPARATUS FOR CONTROLLING THE FUEL FLOW TO A STEAM REFORMER IN A FUEL CELL SYSTEM

CROSS REFERENCE TO RELATED APPLICATION

The subject matter of this application is related to application Ser. No. 633,992 filed Nov. 20, 1975 entitled "Method and Apparatus for Controlling the Fuel Flow to a Stream Reformer in a Fuel Cell System", Elliot I. Waldman. inventor, filed on even date herewith, and having the same assignee as this application.

BACKGROUND OF THE INVENTION

1. Field of the Invention

This invention relates to a method and apparatus for controlling the fuel flow in fuel cell systems.

2. Description of the Prior Art

A fuel cell is a device which directly converts chemical energy into electrical energy. A fuel, typically, hydrogen, and an oxidant, typically air, are supplied to electrodes which are spaced apart by an electrolyte containing member. Electrons flow through an external circuit from one electrode to the other and constitute the electrical output of the cell. Fuel and air must be supplied to the respective electrodes so that current can be continually supplied to a load in the external circuit. Often the fuel is steam reformed to produce hydrogen in a package outside the fuel cell called a reformer.

Fuel cell control systems have maintained the desired cell output by maintaining the operating temperature of the fuel cell since the cell performance is a function of the temperature. It is also known to monitor reactant pressure, humidity levels, electrolyte concentration, flow rates and a host of other parameters to keep the system operating under optimum conditions.

A more recent method for maintaining the desired cell output is described in U.S. Pat. No. 3,585,078, "Method of Reformer Fuel Flow Control" by R. A. Sederquist and John W. Lane, of common assignee with the present invention. A companion U.S. Pat. No. 3,585,077, "Reformer Fuel Flow Control" by E. I. Waldman (applicant for the present invention) of common assignee with the present invention, describes and claims apparatus suitable for use with the method of the aforementioned U.S. Pat. No. 3,585,078. In those patents feed flow to the reformer is regulated as a function of the fuel cell gross current in combination with biasing the reformer feed flow as a function of reactor temperature. In one aspect of those inventions steam is provided as a primary flow to a variable area ejector wherein a gaseous fuel supply is the secondary flow. Steam flow is regulated depending upon the gross current and reactor temperature. As steam flows into the ejector it creates a low pressure area which draws or aspirates fuel into the ejector; the greater the steam flow, the greater the fuel flow. The fuel mixes with the steam and is conveyed to a catalytic reformer where this feed is steam reformed. The reformed mixture may be fed directly from the steam reformer to the fuel cell or into additional reforming equipment and then to the fuel cell.

A problem with the foregoing system is that the reformer experiences clogging from carbon build-up resulting in a continuously increasing ejector back pressure with time. Of course, the ejector is pumping fuel against this back pressure. The increase in back pressure due to clogging of the reformer prevents the proper fuel flow resulting in reduced efficiency of the system.

In systems where hydrodesulfurizing of the fuel is necessary, such as in those systems described in U.S. Pat. No. 3,480,417 to H. J. Setzer, also of common assignee with the present invention, the ejector must also pump recycled hydrogen as well as the fresh fuel flow. The additional pumping required of the ejector, coupled with a further increase in ejector back pressure due to the additional components in the system, make it very difficult if not impossible to provide the required fuel flow even with no clogging of the steam reformer.

SUMMARY OF THE INVENTION

It is an object of the present invention to improve the control of fuel feed to a fuel cell.

A further object of the present invention is to provide, in a fuel cell system wherein an ejector is used to pump fuel into reforming equipment, a method for making ejector pumping requirements substantially independent of ejector back pressure variations.

Accordingly, in a fuel cell system including a steam reformer and an ejector for pumping steam as the primary flow and gaseous fuel as the secondary flow to the reformer, the method of the present invention comprises increasing controlling the rate of fuel flow into the ejector by controlling the rate of steam flow into the ejector, trimming the fuel flow to the ejector using passive trim means, and decreasing the pressure of the fuel supplied to the passive trim means to compensate for changes in the ejector back pressure.

In a preferred embodiment the pressure of the fuel feed flow to the ejector is maintained at the same level as the ejector back pressure. Pressure changes may be accomplished by a pressure regulator in the fuel feed conduit to the ejector. An ejector back pressure signal is sent to the pressure regulator which increases or decreases the fuel feed pressure to the passive trim means as necessary to maintain the pressures equal. It is also contemplated by the present invention that, if desired, the pressure of the fuel feed flow to the passive trim means may only be increased if the ejector back pressure exceeds a certain predetermined level.

In a fuel cell system of the type contemplated in the present invention, as well as in the fuel cell systems described in the aforementioned Sederquist et al. patent, the best system performance is obtained for a specific steam to fuel ratio which should remain constant throughout all operating conditions of the system. If there is no reformer clogging, the ejector back pressure is known for all fuel cell operating conditions. A constant fuel to steam ratio may then be accomplished using a passive fuel trim device, such as a laminar restrictor in the fuel feed conduit to the ejector. However, increasing ejector back pressure due to clogging over a period of time prevents the ejector from providing the desired constant steam to fuel ratio. The present invention overcomes this problem by eliminating the effects of changing back pressure on the pumping characteristics of the ejector.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a schematic diagram of a fuel cell system according to the present invention.

DESCRIPTION OF THE PREFERRED EMBODIMENTS

Referring to the drawing, a fuel cell system, utilizing a natural gas fuel, is shown embodying the features of the present invention. A fuel cell 8 has output leads 9 through which electrons generated in the fuel cell are made available to an external load 10. A water supply is converted to steam in a boiler 12 and ducted via a conduit 14 to variable area ejector 16 wherein the steam is the ejector primary flow. Natural gas fuel from a suitable source 18 is conveyed into a pressure regulator 20 via a conduit 21. The fuel (the ejector secondary flow) passes from the pressure regulator 20 into the ejector 16 via a conduit 22 which includes a passive fuel trim, which in this instance is a laminar restrictor 23. The fuel is mixed with steam in the ejector 16 and the fuel/steam mixture is ducted to the reformer 24 via a conduit 25. In the reformer the natural gas fuel is steam reformed to its individual constituents of hydrogen, carbon dioxide, carbon monoxide, and certain residual water and methane. The steam-reformed fuel is ducted to the fuel electrode chamber of the fuel cell 8 via a conduit 26.

Generally, more fuel is circulated through the cell than will be utilized, and the excess of the circulated fuel is discharged from the cell and ducted to a burner 28 via a conduit 30 where it is mixed with air supplied through a conduit 32. This mixture is combusted in the burner 28 for the purpose of supplying heat for the reforming reaction. The burner exhaust gases are ducted to a heat exchanger 34 via a conduit 36 for the purpose of utilizing the waste heat to provide the heat needed to boil the water in the boiler 12.

In operation, the fuel cell is a demand system and the reformer must replenish the fuel supply at the fuel electrode. Fuel is supplied to the fuel cell and the excess is ducted to the burner 28. If the supply is below that required by the fuel cell and the reformer, an insufficient amount of fuel effluent will be rejected by the cell and burned in the burner 28, thereby causing the reformer temperature to decrease. On the other hand, if the excess fuel is too great the reformer temperature increases.

As in the system of the hereinabove mentioned Sederquist et al patent, a flow control computer 38 is provided which responds to a current signal from a sensor 40. In addition, the computer is shown as responding to a reformer temperature as signaled to the computer from a pickup 42. The computer 38 incorporates the signals from the current sensor and the temperature pickup and transmits a signal to a device for controlling the amount of steam flow into the ejector 16. In this instance the device is an actuator 44 which controls the movement of a pintle 46, the movement of which controls the area of the ejector orifice 48 thereby controlling the rate of flow of steam through the ejector 16. The ejector is designed so the steam flow is always critical or nearly critical, so that variations in ejector back pressure have little or no effect on the steam flow. As is typical of ejector operation, as steam flow increases the natural gas supply introduced into the ejector (ejector secondary flow) from the conduit 22 increases. The trimming device or laminar restrictor 23 is designed to maintain a constant steam to fuel ratio for all fuel cell operating modes (i.e., it matches the fuel flow rate to the ejector operating characteristics). The computer 38 biases the reformer feed flow, being a mixture of steam and natural gas, is scheduled to increase with gross current according to a schedule like that represented by FIG. 2 in the aforementioned Sederquist et al patent, incorporated herein by reference.

As hereinabove discussed, during extended operation carbon deposits build up in the steam reformer, slowly increasing the ejector back pressure. The laminar restrictor cannot compensate for this pressure increase, and consequently the proper steam to fuel ratio is not maintained.

According to the present invention, the pressure regulator 20 receives a pressure signal representative of the ejector back pressure at 50 and a pressure signal representative of the fuel gas pressure at 52 which is the pressure regulator output pressure. The pressure regulator 20 increases the pressure at 52 (i.e., the pressure of the fuel supplied to the laminar restrictor 23) by amounts corresponding to increases in the back pressure at 50. Of course, the pressure of the fuel entering the pressure regulator via the conduit 21 must be at least as great as the maximum pressure which will be needed at 52. If the source of fuel is not already at a sufficiently high pressure, a pump may be required.

One type of pressure regulator suitable for use in the present system is the double diaphragm balanced valve regulators made by Maxitrol Co., Southfield, Mich., having Model Nos. R400SZ, R500SZ, and R600SZ, these models being of similar design but of varying capacity. The fluid pressures at 50 and 52 act directly on these regulators which are designed to automatically increase or decrease the pressure at 52 by an amount equal to the change in the back pressure at 50. These pressure regulators also have the capability of shutting off the flow of fuel completely, eliminating the need for a separate shut off valve. With this system the ejector pumping action is virtually independent of the back pressure at 50. A simple passive fuel trim (laminar restrictor 23) is now all that is needed to maintain a constant fuel to steam ratio throughout all operating modes of fuel cell regardless of back pressure changes, whatever their cause.

In the foregoing embodiment the fuel reforming equipment is shown simply as a steam reformer. This is merely by way of example. The present invention is particularly suitable for use with other reforming equipment in combination with a steam reformer, such as shift converters, selective oxidizers, and hydrodesulfurizers. For example, a system requiring a hydrodesulfurizer to remove sulfur from the fuel before it enters a steam reformer requires the recycling of hydrogen or partially processed hydrogen (such as shown and described in U.S. Pat. No. 3,480,417). The ejector used to pump the fuel is also used as the pump for recycling the hydrogen. The present invention alleviates the work load of the ejector which is limited in its pumping capacity by the steam flow rates required by the reformer. The additional burden created by clogging of the reforming equipment is not present in a system incorporating the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In a fuel cell system having a fuel cell with fuel reforming apparatus upstream of said fuel cell, said apparatus including a steam reformer, and an ejector upstream of the reforming apparatus, the method of regulating the feed flow to the reforming apparatus comprising:

introducing steam into the ejector as the primary flow thereof;

introducing a gaseous fuel into the ejector as the secondary flow thereof for mixing with the steam therein;

controlling the rate of fuel flow into the ejector by
1. controlling the rate of steam flow into the ejector;
2. trimming the fuel flow to the ejector using passive trim means in the conduit carrying the fuel to the ejector; and
3. increasing and decreasing the pressure of the fuel supplied to the trim means by amounts equivalent to increases and decreases in the ejector back pressure; and conveying the mixture of fuel and steam from the ejector into the fuel reforming apparatus.

2. The method of claim 1 wherein said step of increasing and decreasing the pressure of the fuel supplied to the trim means comprises maintaining the pressure of the fuel upstream of the trim means the same as the ejector back pressure.

3. The method according to claim 1 wherein said step of increasing and decreasing the pressure of the fuel supplied to the trim means includes transmitting a pressure signal corresponding to said back pressure to pressure regulating means, said pressure regulating means controlling the pressure of the fuel supplied to the trim means in response to said signal.

4. The method of claim 1 wherein said step of trimming includes matching the fuel flow rate to the ejector operating characteristics to maintain a constant steam to fuel ratio for all steam flow rates.

5. A fuel cell system including a fuel cell, fuel reforming apparatus upstream of said fuel cell for providing reformed fuel to said cell, said reforming apparatus including a steam reformer, ejector means upstream of said reforming apparatus for providing a mixture of fuel and steam into said apparatus, said ejector means including a variable area orifice, means operatively associated with said fuel cell, said ejector means, and said reforming apparatus for controlling the area of said orifice and thereby the rate of steam flow into said ejector means, said steam being the primary flow of said ejector means, and fuel supply means in communication with said ejector means for supplying a gaseous fuel as the secondary flow to said ejector means, said fuel supply means including passive trim means operatively associated therewith for matching the fuel flow rate to the ejector operating characteristics and pressure regulating means upstream of said passive trim means, said pressure regulating means being responsive to the ejector means back pressure and being designed and constructed to increase and decrease the pressure of the fuel supplied to said passive trim means by amounts equivalent to increases and decreases in the back pressure.

6. The fuel cell system according to claim 5 wherein said fuel supply means includes a conduit for conveying fuel into said ejector means, and said trim means is a laminar restrictor disposed in said conduit.

7. The fuel cell system according to claim 5 wherein said pressure regulating means is designed and constructed to maintain the pressure of the fuel supplied to said passive trim means equal to said ejector means back pressure.

* * * * *